Oct. 31, 1939.  G. C. GEORGE  2,177,648
TRAIN BRAKE CONTROL MECHANISM
Filed Aug. 21, 1937
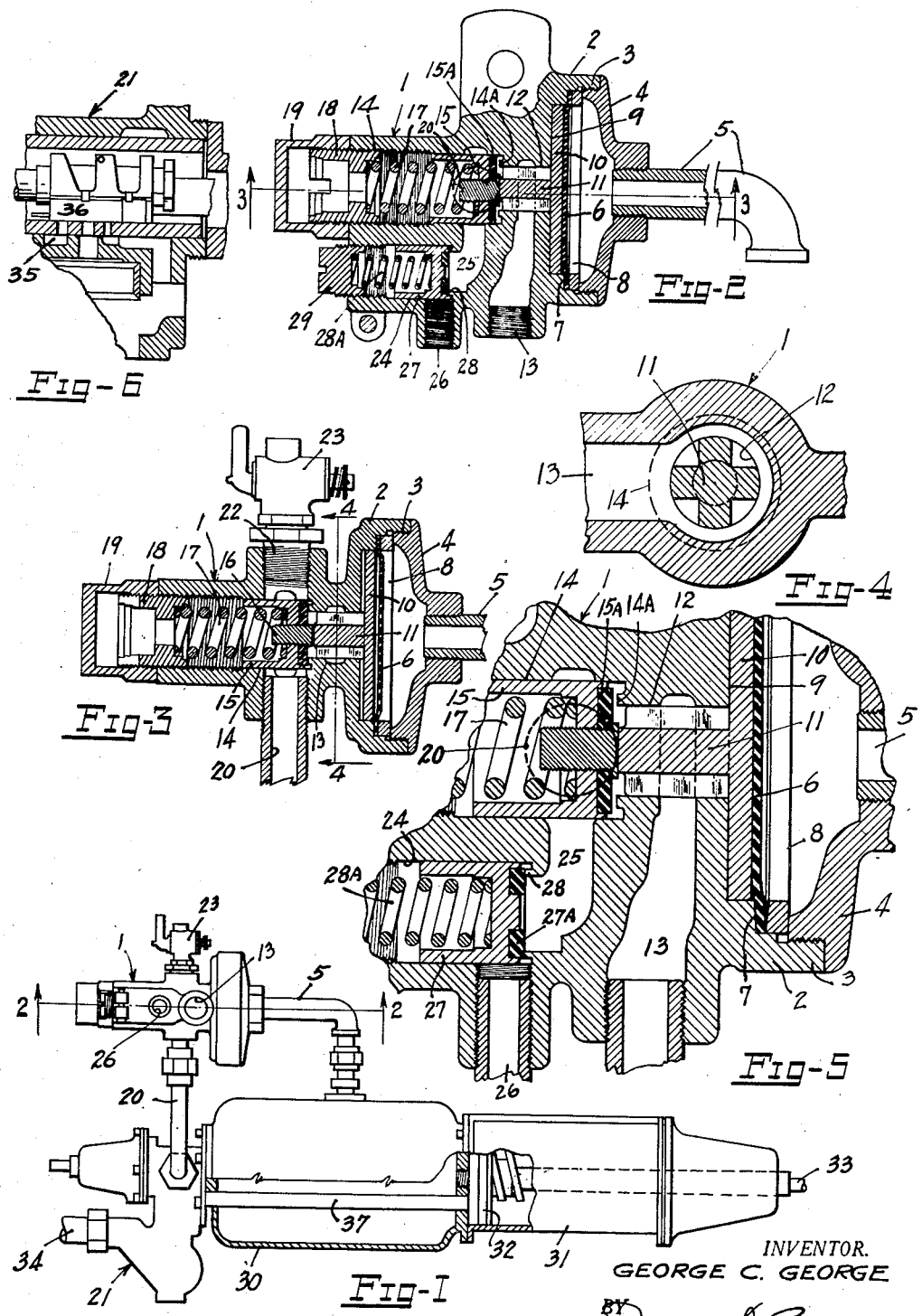
INVENTOR.
GEORGE C. GEORGE
BY James D. Girnaw
ATTORNEYS.

Patented Oct. 31, 1939

2,177,648

UNITED STATES PATENT OFFICE 2,177,648

TRAIN BRAKE CONTROL MECHANISM

George C. George, Seattle, Wash., assignor to John R. Dodson, Portland, Oreg.

Application August 21, 1937, Serial No. 160,199

1 Claim. (Cl. 303—78)

This invention relates to improvements in brake retainer mechanism and more particularly to the type of brake retainer mechanism shown and described in my United States Patent No. 1,858,493 dated May 17, 1932.

In said patent I show in Figure 3 of the drawing and indicate by reference numeral 32 what is commonly termed a hand actuated "blow-down" valve of standard construction.

The principal object of the present invention is to provide a "blow-down" valve entirely automatic in operation, of inexpensive and compact construction and one which will automatically reduce the brake cylinder pressure to any given amount required on a recharge.

A further object of the automatic "blow-down" valve is to provide means for automatically reducing the brake cylinder pressure and maintaining the reduced pressure in the brake cylinder while recharging the auxiliary reservoir.

Another object of the automatic "blow-down" feature of the invention is the provision of means for securing uniformity of action of all the brakes of the train of cars employing an air brake system. The "blow-down" valve automatically reduces the air pressure within the brake cylinder to an equal amount in each car of the train.

These and other objects will appear as my invention is more fully hereinafter described in the following specification, illustrated in the accompanying drawing, and finally pointed out in the appended claim.

In the drawing:

Figure 1 is a side elevation of a retainer valve installed in connection with a triple valve, auxiliary reservoir and brake cylinder of standard construction, parts being broken away for convenience of illustration. In this view the "blow-down" valve is not shown since it is incorporated and housed within the retained valve body.

Figure 2 is a slightly enlarged sectional view taken on the line 2—2 of Figure 1.

Figure 3 is a sectional view taken on the line 3—3 of Figure 2.

Figure 4 is a slightly enlarged fragmentary sectional view taken on the line 4—4 of Figure 3.

Figure 5 is an enlarged fragmentary view of Figure 2.

Figure 6 is a fragmentary sectional detail view showing parts of a triple valve with which my retainer valve is connected.

Referring now more particularly to the drawing:

The retainer valve comprises a housing, generally indicated at 1, formed at one end with an enlarged portion 2 having an internally threaded annular wall 3 to receive a threaded cap 4 which is connected with a pressure inlet pipe 5 connecting with the auxiliary reservoir. A flexible diaphragm 6, preferably made of rubber, is disposed within the enlarged portion and held against a shoulder 7 by means of a retaining ring 8. The bottom wall 9 of the enlarged portion forms a seat for a valve 10 which is provided with a fluted stem 11 which is slidably mounted within a bore 12 of the body 1. The diaphragm 6 is adapted, under pressure from the auxiliary reservoir to bear against the valve 10 to seat the same.

The bore 12 is in open communication with an exhaust duct 13 for escapement of air, to be more fully hereinafter described. The body 1 is also provided with a slightly larger bore 14 in axial alignment with the bore 12 and a valve seat 14A is formed therebetween. Within the bore 14 is slidably mounted a piston 15 provided at one end with a composition ring or facing 15A, secured in place by a flanged screw plug 16, and adapted for engagement, as a valve, with the valve seat 14A. The piston is cup shaped, as shown, to receive one end of a compression spring 17 whose opposite end bears against an adjustably mounted plug 18 threadedly mounted within the bore 14, as shown. The outer end of the bore 14 is provided with a closure cap 19 which also serves as a locknut to retain the plug 18 in any of its adjusted positions. The spring 17 yieldingly maintains the piston valve 15 against its seat 14A and against the valve stem 11 of the valve 10. The spring is adjustable, by means of the plug 18, to yield to a predetermined pressure of air against the valve 10 and its stem 11. In other words, when the air pressure in the auxiliary reservoir is applied through pipe 5, to the diaphragm 6, and is greater than the setting of the spring 17, the valve 10, through its stem 11, will unseat the piston valve 15.

In open communication with the interior of the bore 14 is a pipe 20 connecting with the triple valve, generally indicated at 21. An exhaust opening 22 is also in communication with the interior of the bore 14 and is provided with a manually actuated release valve 23 for exhausting all the air from the brake cylinder for rendering the retainer valve of any individual car, ineffective only when so desired or necessary.

As best illustrated in Figures 2 and 5, the automatic "blow-down" valve comprises or includes a supplemental bore 24 in the valve body 1. This bore connects with an exhaust duct 25 terminating in an outlet 26. The duct 25 also connects with the bore 14. Within the bore 24 is slidably mounted a piston valve 27 adapted to seat against a valve seat 28. The valve end of the piston 27 is also provided with a ring or facing 27A of any approved material. The piston is cup-shaped to receive one end of a compression spring 28A whose opposite end bears against an adjustable retaining plug 29 threadedly mounted within the bore 24.

The compression of the spring 28A may be adjusted by means of the plug 29 to exert a predetermined pressure against the piston to hold it closed against predetermined air pressure within the duct 25. For example, if the spring were set for twenty-five pounds it would require twenty-five pounds plus of air pressure in the duct to back the piston away from its seat against the action of the spring.

In Figure 1 I have shown a conventional auxiliary reservoir 30 operatively interconnected with a brake cylinder 31 having the usual piston 32 slidably mounted therein and adapted to actuate a brake rod 33 under suitable pressure. The conventional triple valve 21 is connected with the auxiliary reservoir in the usual manner and, as aforesaid, the pipe 20 interconnects the bore 14 and duct 25 with the triple valve so that air pressure under certain conditions and a certain setting of the triple valve may enter the bore and duct and surround the piston 15 to be dealt with thereby.

In connecting my retainer valve with air brake mechanism, the pipe 5 is connected with the auxiliary reservoir 30, and the pipe 20 is connected with the exhaust opening or port 35 (Figure 6), of the triple valve, said exhaust port being arranged and connected by slide valve mechanism 36 of well known form with a pipe 37 which extends through the auxiliary reservoir 30 to the brake cylinder 31. The slide valve 36 is capable, when moved into what is known as "service position", of connecting the pipe 37 with the auxiliary reservoir to permit air from the auxiliary reservoir to pass to the brake cylinder and set the brakes.

In the operation of the usual brake mechanism when the brakes are to be set, the engineer reduces or releases the pressure in the train line or brake service pipe 34 connected with the triple valve. This reduction in pressure moves the slide valve 36 into "service position" and connects the auxiliary reservoir 30 to the brake cylinder admitting air thereto under pressure from the auxiliary reservoir and applying the brakes through the piston and brake rod, as aforesaid. As long as the pressure in the train line pipe 34 is less than the pressure in the auxiliary reservoir the brakes will remain set but their effectiveness will be gradually reduced by leakage of air, and as long as the slide valve 36 remains in the service position it is impossible to recharge the auxiliary reservoir 30. To release the brakes and recharge the reservoir, pressure from the usual compressor (not shown) in the engine is admitted to the pipe 34. This moves the slide valve 36 to "charging position", changing the connections as follows: Communication between the pipe 37 and the auxiliary reservoir 30 is shut off and the pipe 37 is connected with the triple valve exhaust port 35 allowing the pressure in the brake cylinder to exhaust; communication is also established between the train line or service pipe 34 and the auxiliary reservoir 30 allowing the auxiliary reservoir to be recharged to the required pressure. It is now common practice to allow the compressed air from the brake cylinder to exhaust into the atmosphere thus fully releasing the brakes before the auxiliary reservoir has had time to become safely recharged. Where the brakes are reapplied immediately after they are released and this procedure is repeated a number of times, the auxiliary reservoir pressure may be reduced to such an extent that it will not apply the brakes with sufficient force to hold the train. But with my retainer valve I eliminate this dangerous condition. The retainer valve is connected by the pipe 20 with the exhaust port 35, of the triple valve, and by the pipe 5 with the auxiliary reservoir, thus the air from the brake cylinder must exhaust through the retainer valve and past the piston valve 15 before the brakes can be released. However, said piston valve will be held in closed position by the spring 17 to prevent escapement of the air from the brake cylinder until such time as the auxiliary reservoir 30 has been charged up to its predetermined normal pressure and exerts sufficient pressure through pipe 5 against the diaphragm 6, valve 10 and its stem 11 to overcome the pressure of the spring 17, whereupon the piston valve will be forced open to allow the air from the brake cylinder to exhaust past said piston valve and escape through the flutes of the valve stem 11 thence through the main exhaust duct 13 and out into the atmosphere. The release of the brakes is thus automatically controlled by the pressure within the auxiliary reservoir, or a reservoir subject to train line pressure control, it being impossible to release said brakes until the auxiliary reservoir pressure is sufficient to overcome the pressure of the spring 17 which is set or adjusted to insure a safe recharge pressure in the reservoir.

Assuming that there is fifty pounds of pressure in the brake cylinder, sixty pounds of pressure in the auxiliary reservoir, and that sixty pounds of pressure is being applied through pipe 5 to the diaphragm 6, and also assuming that the spring 17 has been adjusted or compressed by the adjusting plug 18 to exert seventy pounds of pressure against the end of the fluted stem 11, it will be seen that the piston valve 15 will remain seated since the pressure of the spring is greater than the air pressure from the auxiliary reservoir applied against the diaphragm and piston. At the same time, air from the brake cylinder is also being applied against the "blow-down" piston valve 27 through the duct 25 which is in open communication with the pipe or port 20, and as long as the brake cylinder pressure is greater than the setting or pressure of the "blow-down" spring 28A the piston valve 27 will be unseated to permit escapement of air pressure from the brake cylinder down to a predetermined amount, say, for example, twenty-five pounds. When the pressure has been reduced to this amount the piston valve 27 will close and thereby retain twenty-five pounds of pressure in the brake cylinder. This retained amount of air pressure in the brake cylinder provides a reservoir of air adaptable for applying the brakes until the auxiliary reservoir has been recharged to its normal capacity. By my system the brake cylinder of each car is thus provided with twenty-five pounds of pressure so that the brakes of each car will be applied equally to insure smooth braking operation. This twenty-five pounds of air is retained in the brake cylinder and is not released until the auxiliary reservoir has been fully recharged, and when so recharged the pressure of air through pipe 5 against diaphragm 6, piston 10 and its stem 11 will back the piston 15 away from its seat to allow all the air in the brake cylinder to escape through the pipe 20, through the fluted valve stem 11 and into the exhaust duct 13 and thence to the atmosphere.

While I have shown a particular form of embodiment of my invention I am aware that many minor changes will suggest themselves to others skilled in the art without departing from the spirit and scope of the invention. Having thus described the invention, what I claim as new and desire to protect by Letters Patent is:

A retainer valve for air-brake systems, comprising a housing formed with two cylindrical bores, a piston slidably and yieldingly mounted in each of said bores, an air duct in open communication with both of said bores and periodically subject to brake cylinder pressure by the action of one of said pistons at a predetermined value of brake cylinder pressure, an air exhaust duct in open communication with said air duct and normally held closed by the other of said pistons, and means actuated by air pressure for moving the other of said pistons for establishing communication between the air duct and said air exhaust duct, and said air duct adapted to be isolated by either one of said pistons at a predetermined value of brake cylinder pressure.

GEORGE C. GEORGE.